(12) United States Patent
Park et al.

(10) Patent No.: US 11,149,962 B2
(45) Date of Patent: Oct. 19, 2021

(54) STEAM COOKER

(71) Applicant: SAMSUNG ELECTRONICS CO., LTD., Suwon-si (KR)

(72) Inventors: Geun Yong Park, Hwaseong-si (KR); Se Hun Lee, Suwon-si (KR); Dong Jin Oh, Yongin-si (KR); Pung Yeun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 15/989,838

(22) Filed: May 25, 2018

(65) Prior Publication Data

US 2018/0340695 A1 Nov. 29, 2018

Related U.S. Application Data

(60) Provisional application No. 62/511,053, filed on May 25, 2017.

(30) Foreign Application Priority Data

Dec. 8, 2017 (KR) .......................... 10-2017-0168156

(51) Int. Cl.
*F24C 15/32* (2006.01)
*F24C 15/00* (2006.01)
*F24C 13/00* (2006.01)

(52) U.S. Cl.
CPC ............ *F24C 15/327* (2013.01); *F24C 13/00* (2013.01); *F24C 15/003* (2013.01); *F24C 15/006* (2013.01)

(58) Field of Classification Search
None
See application file for complete search history.

(56) References Cited

U.S. PATENT DOCUMENTS

| 2003/0037780 A1 | 2/2003 | Wiersma et al. |
| 2005/0051160 A1 | 3/2005 | Kim |

(Continued)

FOREIGN PATENT DOCUMENTS

| CN | 1946970 | 4/2007 |
| DE | 10245773 | 12/2003 |

(Continued)

OTHER PUBLICATIONS

European Search Report dated Apr. 3, 2020 in European Patent Application No. 18805160.1.

(Continued)

*Primary Examiner* — Joseph M. Pelham
(74) *Attorney, Agent, or Firm* — Staas & Halsey LLP

(57) ABSTRACT

A steam cooker having a main body, a cavity provided inside the main body, a steam generator provided to generate steam, a supply pipe connecting the steam generator to the cavity to supply steam into the cavity, a discharge pipe arranged to discharge the steam inside the cavity to the outside of the cavity, a discharge nozzle coupled to an end of the discharge pipe, and a cooling fan provided between the cavity and the main body to cool the cavity, and wherein the discharge nozzle is disposed adjacent to the bottom of the cooling fan such that steam discharged through the discharge nozzle is guided downward between the cavity and the main body by the cooling fan. The steam cooker can prevent the condensation water from falling down on the lower part of the main body.

12 Claims, 18 Drawing Sheets

(56) References Cited

U.S. PATENT DOCUMENTS

2008/0229936 A1    9/2008  Kaneko et al.
2016/0360916 A1*   12/2016 Utsumi .................. F22B 1/285

FOREIGN PATENT DOCUMENTS

| | | |
|---|---|---|
| EP | 2687787 | 1/2014 |
| JP | 5-14881 | 2/1993 |
| JP | 2005-282893 | 10/2005 |
| JP | 2007-278529 | 10/2007 |
| JP | 2012-182304 | 9/2012 |
| KR | 1999-016398 | 3/1999 |
| KR | 20-0319821 | 7/2003 |
| KR | 10-2007-0062648 | 6/2007 |
| KR | 10-2014-0055296 | 5/2014 |
| KR | 10-1520497 | 5/2015 |
| WO | 2016/105955 | 6/2016 |

OTHER PUBLICATIONS

Partial English Translation of Japanese Reference 2005-282893 dated Oct. 13, 2005.
Partial English Translation of Japanese Reference 2007-278529 dated Oct. 25, 2007.
PCT International Search Report issued in PCT International Application No. PCT/KR2018/005888 dated Sep. 20, 2018 (3 pages total).
Chinese Office Action dated Nov. 24, 2020 in Chinese Patent Application No. 201880048111.6.

\* cited by examiner

STEAM COOKER

CROSS-REFERENCE TO RELATED APPLICATION(S)

This application claims the benefit of U.S. Provisional Application No. 62/511,053, filed on May 25, 2017 in the United States Patent and Trademark Office and Korean Patent Application No. 10-2017-0168156, filed on Dec. 8, 2017 in the Korean Intellectual Property Office, the disclosure of which is incorporated herein by reference.

BACKGROUND

1. Field

Embodiments of the present invention relate to a cooker for cooking food, and more particularly, to a cooker using steam.

2. Description of the Related Art

A typical cooker used for cooking food is a microwave oven using a high frequency and an oven for directly heating food using a heater. The microwave oven has a disadvantage in that there are many restrictions on the type of food that can be cooked and the taste of the food is dry after cooking, and the oven has a disadvantage in that the cooking time is prolonged due to the relatively low density air acting as a heat transfer medium between the heater and the food.

In recent years, a steam cooker that supplies heat to food through steam has been developed as an alternative to overcome the drawbacks of the conventional heating cooker. The use of such steam cooker can maintain the proper moisture in the food to maintain the taste of the food, and the steam filled in a cavity acts as an effective heat transfer medium, thereby shortening the cooking time.

Generally, the steam cooker comprises a cavity having a cooking space, a steam generator for generating steam by heating water, a steam supply pipe for connecting the steam generator to the cavity to supply the steam of the steam generator to the cavity, and a steam discharge pipe for discharging the saturated steam to the outside of the cavity.

SUMMARY

Therefore, it is an aspect of the present disclosure to disclose a steam cooker in which condensation water condensed in a steam supply pipe is prevented from flowing into a cavity when steam is supplied from a steam generator to the cavity through the steam supply pipe.

One aspect of the present disclosure discloses a steam cooker in which condensation of steam is prevented when the steam is discharged from a cavity to the outside of the cavity through a steam discharge pipe.

One aspect of the present disclosure discloses a steam cooker wherein noise is reduced when steam in a cavity is discharged to the outside of the cavity through a steam discharge pipe.

One aspect of the present disclosure discloses a steam cooker in which steam inside a cavity is less leaked to the outside of the cavity between the cavity and a door and through a lamp installation hole or the like.

In accordance with one aspect of the present disclosure, a steam cooker includes a main body; a cavity formed inside the main body; a steam generator to generate steam into the cavity; a supply pipe to connect the steam generator to the cavity to supply the generated steam into the cavity; a discharge pipe to discharge steam inside the cavity to the outside of the cavity therethrough; a discharge nozzle coupled to an end portion of the discharge pipe so that the steam inside the cavity is discharged from the discharge nozzle to the outside of the cavity; and a cooling fan provided between the cavity and the main body to cool the cavity by supplying cool air; and wherein the discharge nozzle is disposed adjacent to a bottom portion of the cooling fan such that steam discharged from the discharge nozzle is guided downward between the cavity and the main body by the cooling fan.

The main body may include a rear plate, the cavity may include a rear wall, and the discharge nozzle may be disposed between the rear plate and the rear wall.

The steam cooker may further include a diffusion space formed between the rear plate and the rear wall so as to be vertically extended and the steam discharged from the discharge nozzle is diffused to the diffusion space by the discharge nozzle.

The discharge nozzle may be disposed at an upper portion of the diffusion space, and the steam discharged from the discharge nozzle may flow downward from the upper portion of the diffusion space.

The steam cooker may further include a mounting space formed between the rear plate and the rear wall to receive the steam generator.

The steam cooker may further include a barrier to partition space between the rear plate and the rear wall into the diffusion space and the mounting space.

The barrier may extend in a vertical direction between the rear plate and the rear wall, and the diffusion space and the mounting space are formed on sides of the barrier, respectively.

The steam may further include a rear support plate disposed between the rear plate and the rear wall to support the steam generator, and wherein the diffusion space may be formed between the rear plate and the rear support plate.

The discharge nozzle may include a collecting space formed to collect condensation water generated when steam in the cavity is discharged to the outside of the cavity.

The discharge nozzle may include a first tube portion coupled to the discharge pipe, a second tube portion having a diameter larger than a diameter of the first tube portion, an expansion portion that is provided between the first tube portion and the second tube portion and a diameter of the expansion portion increases toward the second tube portion, an inlet wall protruding radially inwardly from the first tube portion or the expansion portion and forming an inlet, and an outlet wall protruding radially inwardly from the second tube portion and forming an outlet, and the collecting space may be formed between the inlet wall and the outlet wall.

A diameter of the outlet is equal to or greater than a diameter of the inlet.

A diameter of the inlet is smaller than or equal to a diameter of an inner circumferential surface of the discharge pipe.

In accordance with another aspect of the present disclosure, a steam cooker includes a main body; a cavity formed inside the main body and having an upper wall, a lower wall, a left wall, a right wall, and a rear wall; a steam generator to generate steam; and a supply pipe to connect the steam generator and the cavity to supply steam into the cavity, the supply pipe having a first supply pipe having a first end connected to the steam generator and a second supply pipe having a first end connected to the upper wall of the cavity and to a second end to be connected to a second end of the first supply pipe; and wherein the second supply pipe includes a condensation water guide portion formed to be inclined to prevent condensation water generated when steam of the steam generator is supplied into the cavity from being introduced into the cavity.

The condensation water guide portion may be formed to be inclined upward toward the direction of the steam.

The first supply pipe may include an undercut protruding from an inner circumferential surface of the second end of the first supply pipe to which the second end of the second supply pipe is connected, and by the undercut, the inner circumferential surface of the first supply pipe and an outer circumferential surface of the second supply pipe are spaced apart.

The second supply pipe may be inserted deeper into the first supply pipe than the undercut.

The first supply pipe may include a condensation induction passage having a zigzag shape to induce condensation of steam flowing in the first supply pipe.

The condensation induction passage may include a first inclined portion inclined to one side with respect to a vertical direction and a second inclined portion inclined to an opposite side with respect to the vertical direction.

In accordance with still another aspect of the present disclosure, a steam cooker includes a main body; a cavity provided inside the main body and having an opening; a door coupled to the main body to open or close the opening; a gasket mounting portion formed along an edge of the opening; a gasket provided on the gasket mounting portion to seal between the cavity and the door, the gasket having a plurality of sides and a corner portion connecting the plurality of sides; and wherein the gasket includes a gasket body portion installed in the gasket mounting portion and a lip portion extending from the gasket body portion toward the door so as to be in close contact with the door, and the lip portion includes a deformation compensating portion that compensates for a change in a forward protruding amount of the lip portion with respect to the gasket body portion at the corner portion due to deformation of the gasket at the time of installing the gasket.

The gasket may be relaxed in a longitudinal direction of the side of the gasket when the gasket is installed in the gasket mounting portion.

When the gasket is relaxed, the protruding amount of the lip portion with respect to the gasket body portion at the corner portion is not reduced.

The steam cooker may further include a lamp installation hole provided at the cavity and a lamp unit installed in the lamp installation hole, wherein the lamp unit may include a lamp provided to illuminate an inside of the cavity, a socket installed to penetrate the lamp installation hole to supply power to the lamp, a lamp cover adapted to cover the lamp, a first sealing member configured to seal between the cavity and the socket and a second sealing member configured to seal between the socket and the lamp cover.

The lamp unit may further include a first washer provided between the first sealing member and the second sealing member to bring the first sealing member into close contact with the cavity and a second washer provided between the second sealing member and the lamp cover to fix the second sealing member.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
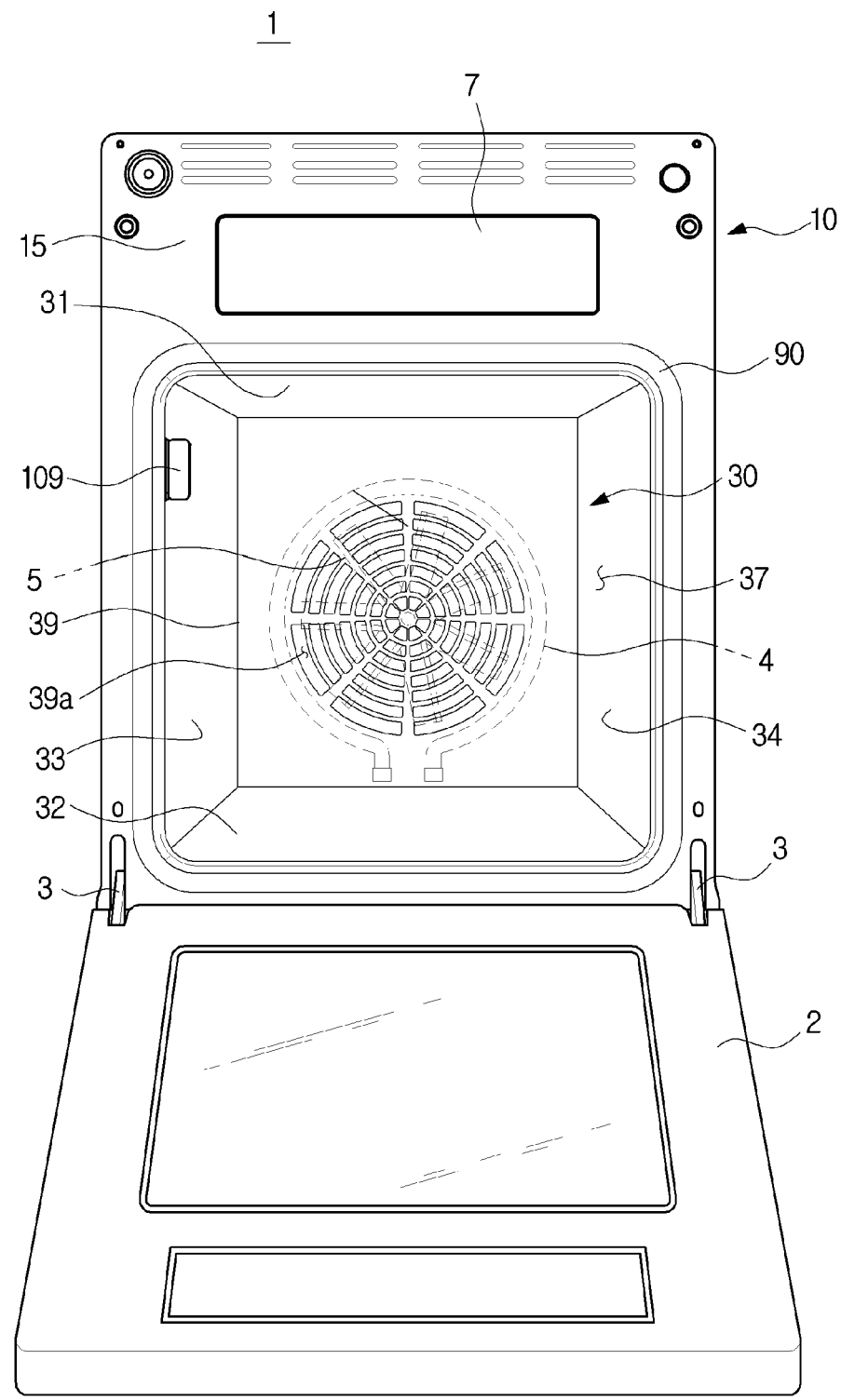
FIG. 1 is a front view of a steam cooker according to an embodiment of the present disclosure.

Because the embodiments described herein are merely the most preferred embodiments of the present invention and are not intended to represent all of the technical ideas of the present invention, it should be understood that various equivalents or variations that may be substituted for the same at the time of filing of the application are also included in the scope of the present invention. The singular representation used in the description may include plural representations unless the context clearly dictates otherwise. The drawings may be exaggerated for clarity, such as the shape and size of the elements.

It is to be understood that the terms 'comprising,' 'including' or 'having' in the present specification is intended to mean that there are features, numbers, steps, operations, elements, parts or combinations thereof described in the specification, and it is to be understood that it does not preclude the presence or addition of one or more other features, numbers, steps, operations, elements, components, or combinations thereof.

Reference will now be made in detail to the embodiments of the present invention, examples of which are illustrated in the accompanying drawings, wherein like reference numerals refer to like elements throughout.

Figure 2:
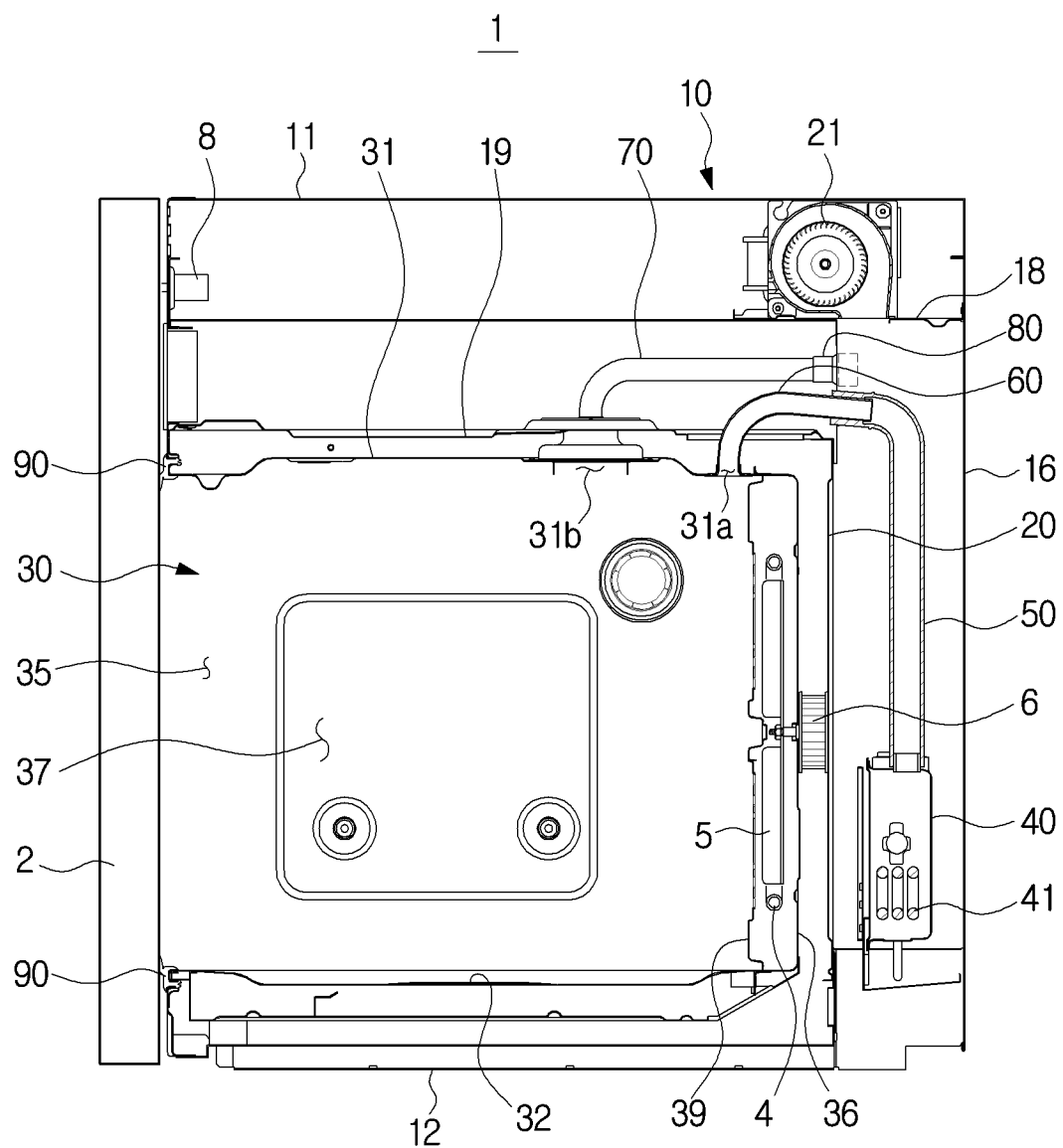
FIG. 2 is a schematic side cross-sectional view showing a main configuration of a steam cooker according to an embodiment of the present disclosure.
Figure 3:
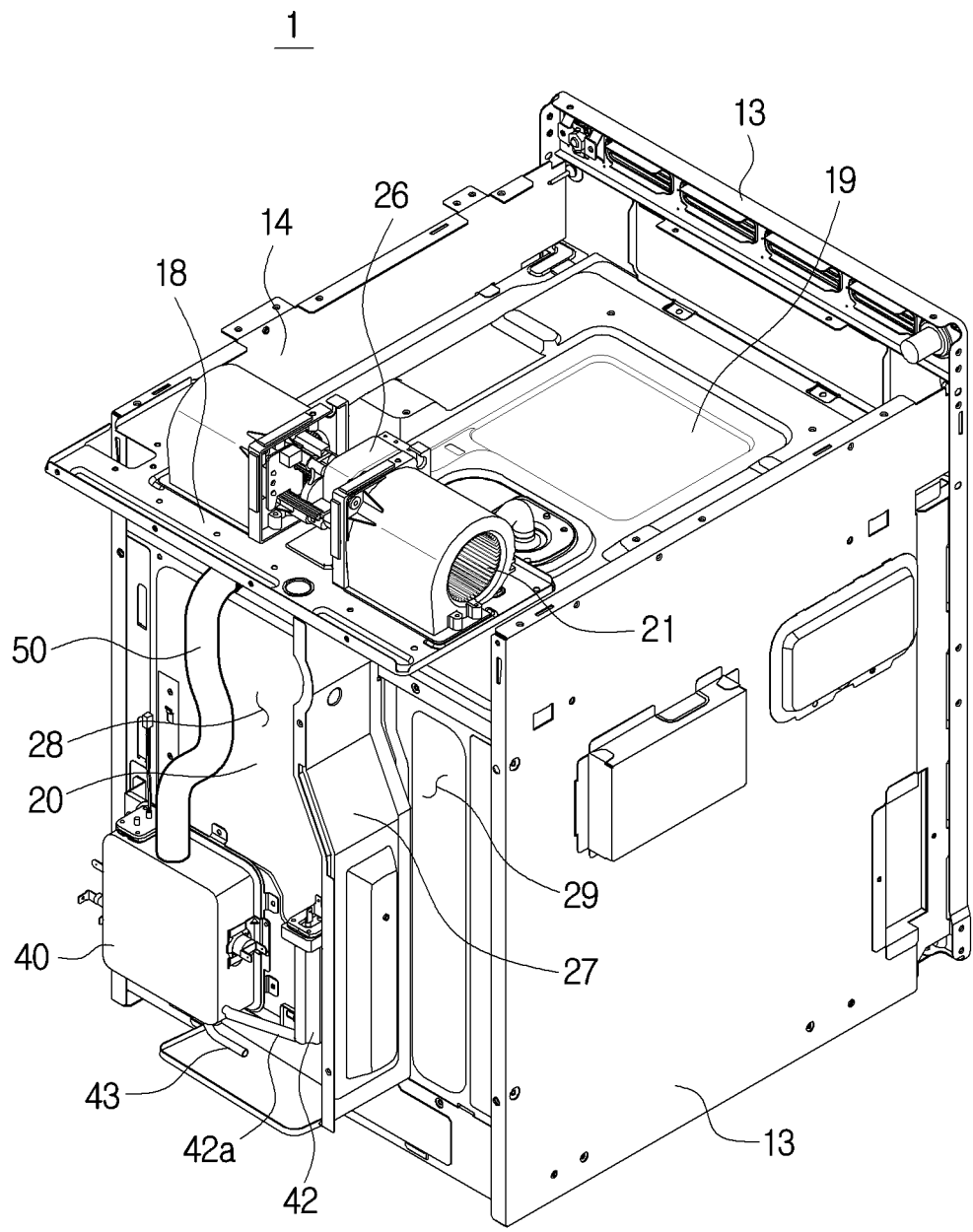
FIG. 3 is a rear perspective view of a steam cooker according to an embodiment of the present disclosure, a top plate and a rear plate of a main body being omitted.
Figure 4:
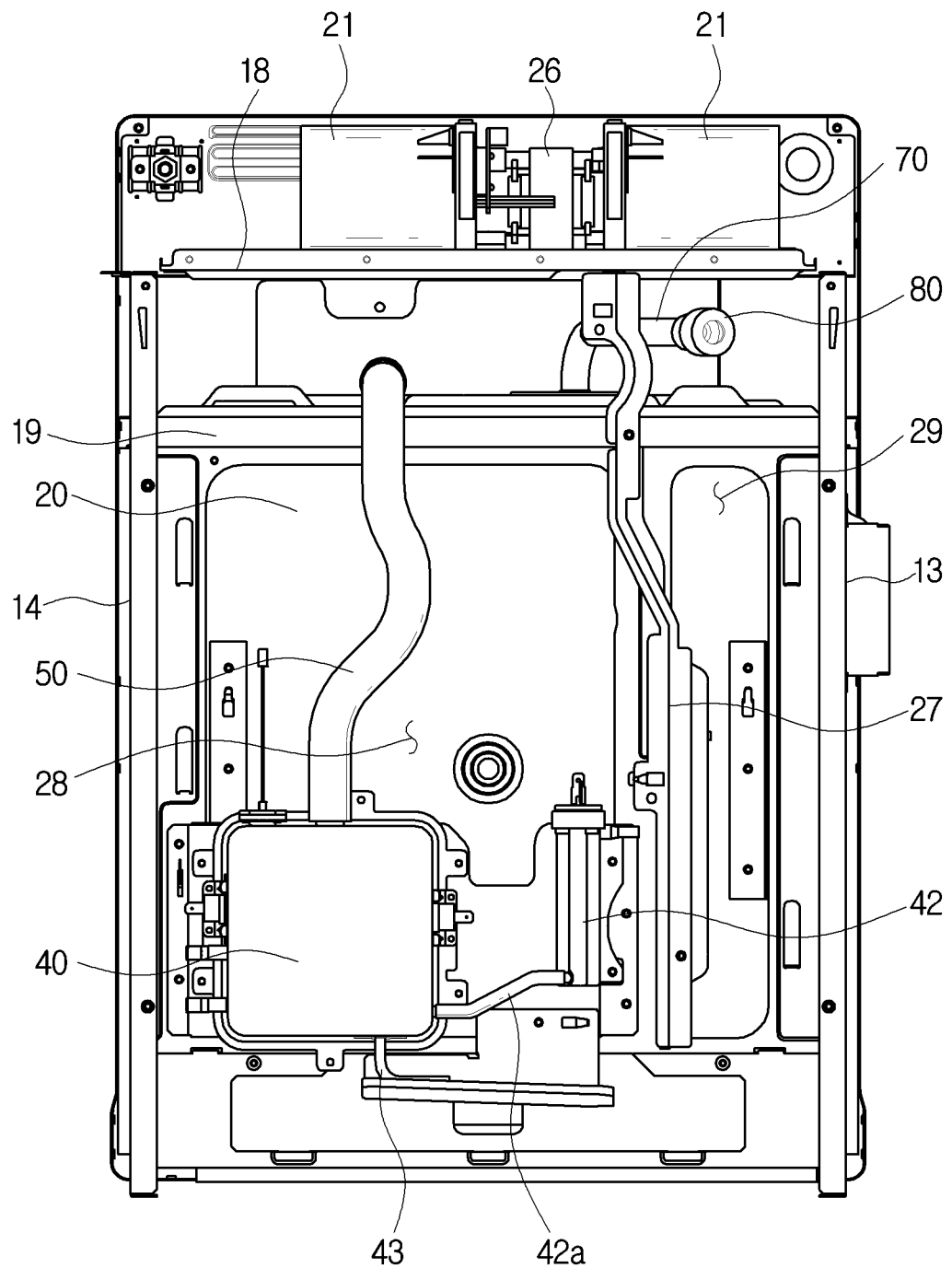
FIG. 4 is a rear view of a steam cooker according to an embodiment of the present disclosure, a top plate and a rear plate of a main body being omitted.

FIG. 1 is a front view of a steam cooker according to an embodiment of the present disclosure. FIG. 2 is a schematic side cross-sectional view showing a main configuration of a steam cooker according to an embodiment of the present disclosure. FIG. 3 is a rear perspective view of a steam cooker according to an embodiment of the present disclosure, a top plate and a rear plate of a main body being omitted. FIG. 4 is a rear view of a steam cooker according to an embodiment of the present disclosure, a top plate and a rear plate of a main body being omitted.

Referring to FIGS. 1 and 2, a steam cooker 1 includes a main body 10, a cavity 30 for cooking food inside the main body 10, a steam generator 40 for generating steam, supply pipes 50 and 60 for connecting the steam generator 40 and the cavity 30 to supply steam into the cavity 30, a discharge pipe 70 connected to the cavity 30 to discharge the steam inside the cavity 30 to the outside and a discharge nozzle 80 coupled to an end portion of the discharge pipe 70.

The main body 10 may have a substantially box shape. That is, the main body 10 may have an upper plate 11, a lower plate 12, a left plate 13, a right plate 14, a front plate 15 and a rear plate 16. An opening may be formed in the front plate 15 of the main body 10 so as to allow food to be introduced into the cavity 30. A display panel 7 for displaying the state of the steam cooker 1 or inputting an operation command may be provided on the upper portion of the front plate 15 of the main body 10.

The cavity 30 is provided inside the main body 10 to receive food. The cavity 30 may be provided in a substantially box shape like the main body 10. That is, the cavity 30 may include a top wall 31, a bottom wall 32, a left wall 33, a right wall 34, a rear wall 36, and a cooking space 37 formed therein. An opening 35 is formed in the front surface of the cavity 30 to allow food to be introduced into the cooking space 37 and the opening 35 can be opened and closed by a door 2. The door 2 can be rotatably coupled to the main body 10 through a hinge 3. The door 2 can be rotated in the vertical direction.

A cooling fan support plate 18 for installing a cooling fan 21 and an upper support plate 19 for supporting the discharge pipe 70 may be provided on the upper side of the cavity 30. A rear support plate 20 for installing a convection motor 6, the steam generator 40, a water level gauge 42, and the like may be provided at the rear of the cavity 30. The cooling fan support plate 18, the upper support plate 19 and the rear support plate 20 may be omitted and the upper wall 31 and the rear wall 36 of the cavity 30 may replace this role.

A heater 4 for heating the air and a convection fan 5 for circulating air and steam in the cooking space 37 may be provided in the rear portion of the cooking space 37 of the cavity 30. A fan cover 39 for covering the heater 4 and the convection fan 5 is provided in front of the heater 4 and the convection fan 5 and a through hole 39a is formed in the fan cover 39.

The cooling fan 21 may be provided between the main body 10 and the cavity 30. The cooling fan 21 can circulate air between the main body 10 and the cavity 30 to cool the cavity 30 and various electrical components 8.

The cooling fan 21 is disposed at a rear upper portion of the main body 10, and may be provided in plurality. Between the plurality of cooling fans 21, a motor 26 for driving the cooling fan 21 may be provided.

The steam generator 40 can generate steam by heating water. To this end, the steam generator 40 may include a heater 41 for heating water. The steam generator 40 is connected to a water reservoir (not shown) through a water supply pipe (not shown) to receive water.

The steam generator 40 may be connected to the water level gauge 42 provided next to the steam generator 40 through a connection pipe 42a. The water level gauge 42 includes a water level sensor (not shown) and can measure the water level of the water supplied to the steam generator 40. A drain pipe 43 for draining water remaining in the steam generator 40 to the outside may be connected to the steam generator 40.

The steam generated in the steam generator 40 can be supplied to the cavity 30 through the supply pipes 50 and 60. The supply pipes 50 and 60 may include the first supply pipe 50 installed in the steam generator 40 and the second supply pipe 60 installed in the cavity 30 to be connected to the first supply pipe 50. The upper wall 31 of the cavity 30 may be provided with a steam supply hole 31a for receiving steam and the second supply pipe 60 may be installed in the steam supply hole 31a.

The first supply pipe 50 may be formed of a resin material such as silicon or urethane, and the second supply pipe 60 may be formed of a metal material. The first supply pipe 50 and the second supply pipe 60 may be connected to each other by inserting the second supply pipe 60 into the first supply pipe 50.

When the steam is saturated in the cavity 30, the steam can be discharged to the outside of the cavity 30 through the discharge pipe 70. A steam discharge hole 31b for discharging steam is formed on the upper wall 31 of the cavity 30 and the discharge pipe 70 can be connected to the steam discharge hole 31b. The discharge nozzle 80 may be coupled to an end portion of the discharge pipe 70. The discharge pipe 70 may be formed of a metal material, and the discharge nozzle 80 may be formed of a resin material such as silicon or urethane.

The steam discharged through the discharge nozzle 80 can be diffused in a diffusion space 29 formed in the rear of the cavity 30. A mounting space 28 in which the steam generator 40 and the water level gauge 42 are mounted and the diffusion space 29 in which the steam discharged through the discharge nozzle 80 is diffused is formed between the rear plate 16 and the rear support plate 20, and the mounting space 28 and the diffusion space 29 can be partitioned to the left and right by a barrier 27 installed in the vertical direction between the rear support plate 20 and the rear plate 16.

The diffusion space 29 is an open space through which the steam discharged from the discharge nozzle 80 can be diffused. As steam is diffused in the diffusion space 29, the steam pressure and the density are lowered, and thus no condensation can occur or be minimized. The diffusion space 29 is separated and partitioned from the mounting space 28 by the barrier 27 so that the condensation water can be prevented from permeating the heater 41 and the electronic component such as the steam generator 40 even if condensation water is generated.

A gasket 90 is provided in the front portion of the cavity 30 so as to seal the space between the cavity 30 and the door 2 when the door 2 is closed and a lamp unit 109 for illuminating the interior of the cavity 30 may be provided on one side wall 33 of the cavity 30.

Figure 5:
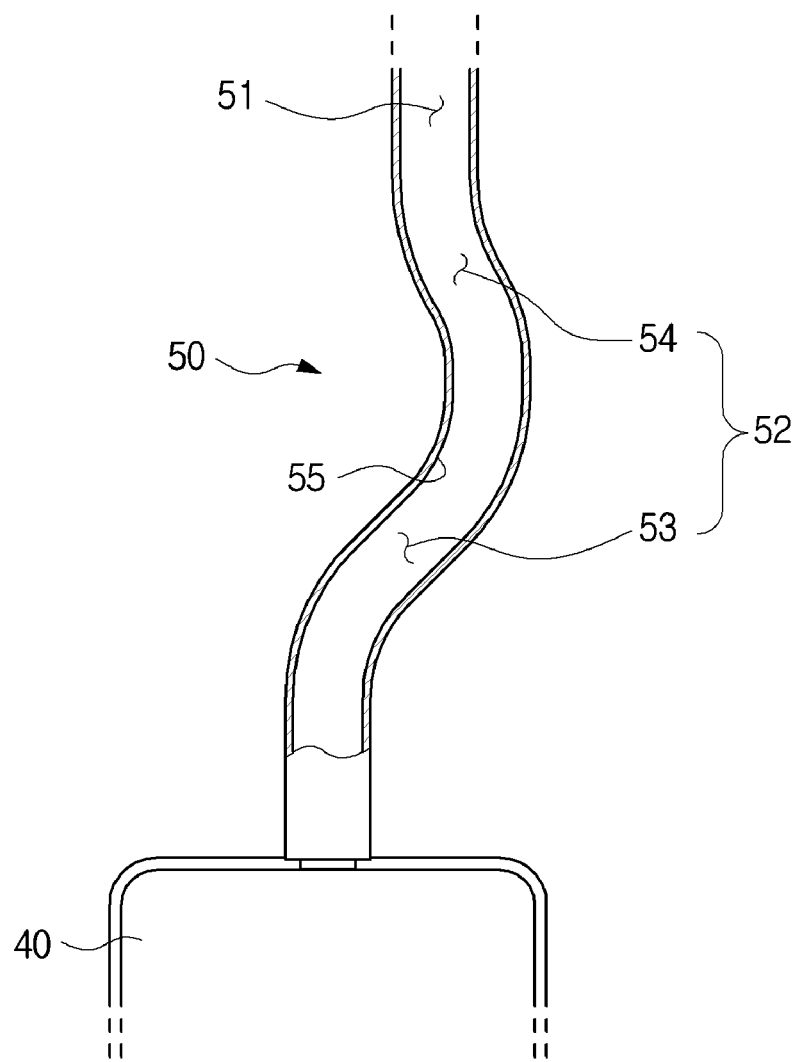
FIG. 5 is a rear view showing a first supply pipe of a steam cooker according to an embodiment of the present disclosure.
Figure 6:
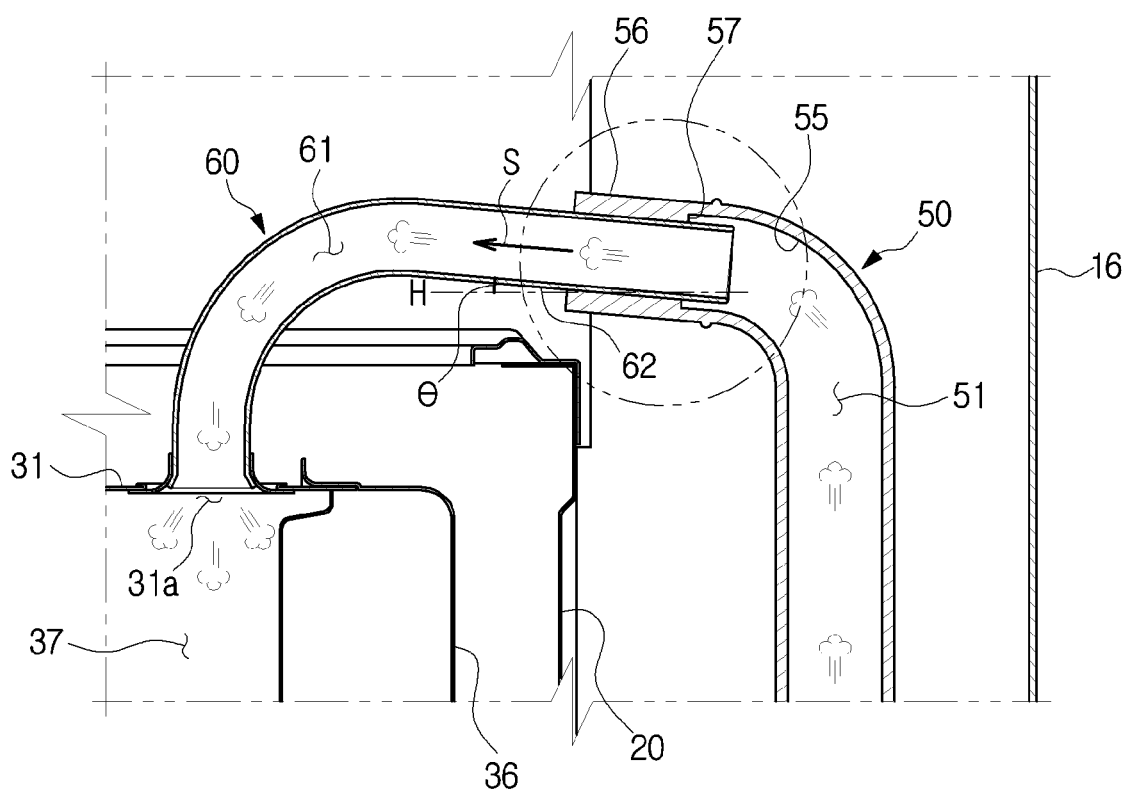
FIG. 6 is a side cross-sectional view showing a first supply pipe and a second supply pipe of a steam cooker according to an embodiment of the present disclosure.
Figure 7:
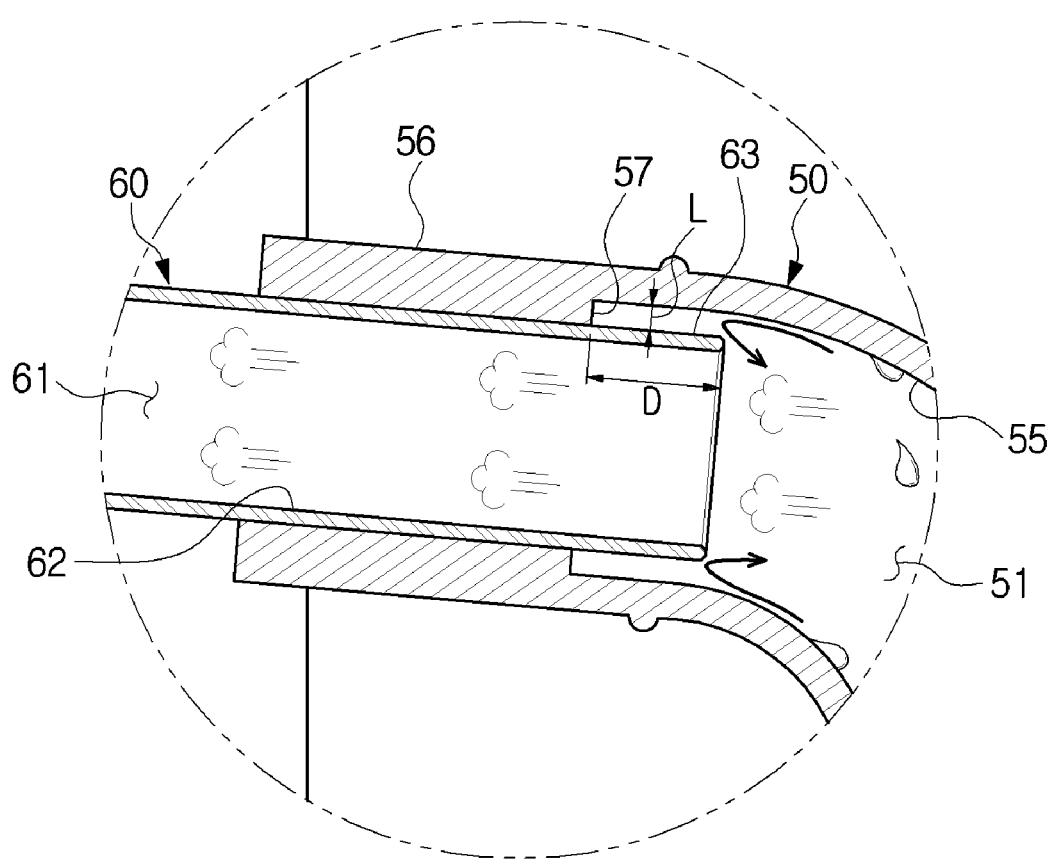
FIG. 7 is an enlarged view of a dotted line portion in FIG. 6.

FIG. 5 is a rear view showing a first supply pipe of a steam cooker according to an embodiment of the present disclosure. FIG. 6 is a side cross-sectional view showing a first supply pipe and a second supply pipe of a steam cooker according to an embodiment of the present disclosure. FIG. 7 is an enlarged view of a dotted line portion in FIG. 6.

Referring to FIGS. 5 to 7, the first supply pipe 50 installed in the steam generator 40 extends in a substantially vertical direction to be connected to the second supply pipe 60 installed in the upper wall 31 of the cavity. The first supply pipe 50 includes a first supply passage 51 formed therein to supply steam generated in the steam generator 40 to the cavity 30.

As shown in FIG. 5, the first supply passage 51 may include a condensation induction passage 52 that allows the condensation of steam to be performed more smoothly when the steam flows. The condensation induction passage 52 may be formed in a zigzag shape having at least a plurality of inclined portions 53, 54. That is, the condensation induction passage 52 may include the first inclined portion 53 inclined to one side with respect to the vertical direction and the second inclined portion 54 inclined to the opposite side with respect to the vertical direction.

The condensation induction passage 52 having such a structure can increase the passing time of the steam passing through the condensation induction passage 52 and increase the area of an inner circumferential surface 55 of the first supply pipe 50 to which steam comes into contact, so that the condensation can be performed well. The condensation water generated can be returned to the steam generator 40 by its own weight, and consequently, the condensation water can be prevented from flowing into the cavity 30.

The first supply pipe 50 and the second supply pipe 60 may be connected to each other by inserting the second supply pipe 60 into the first supply pipe 50 as shown in FIG. 7.

An undercut 57 may protrude from the inner circumferential surface of one end portion 56 of the first supply pipe 50 to which the second supply pipe 60 is connected. The inner circumferential surface 55 of the first supply pipe 50 and an outer circumferential surface 63 of the second supply pipe 60 can be spaced apart by a predetermined distance L.

The second supply pipe 60 can be inserted deeper into the first supply pipe 50 than the undercut 57. For example, the second supply pipe 60 may be inserted deeper by a predetermined distance D than the undercut 57.

With this structure, the condensed water generated inside the first supply pipe 50 can be prevented from proceeding into the second supply pipe 60 and can be returned to the first supply pipe 50. The steam returned to the first supply pipe 50 can be returned to the steam generator 40 by its own weight.

As shown in FIG. 6, the second supply pipe 60 may have a condensation water guide portion 62 formed to be inclined to guide the condensation water to the first supply pipe 50. The condensation water guide portion 62 may be formed to be inclined at a predetermined angle θ with respect to a horizontal direction H. Specifically, the condensation water guide portion 62 may be inclined upward from the second supply pipe 60 toward a direction S of the steam.

Therefore, the condensation water generated in the condensation water guide portion 62 can be returned to the first supply pipe 50 and the steam generator 40 while descending by the self weight along the condensation water guide portion 62 and can be prevented from flowing into the cavity 30.

As described above, by the structure of the zigzag-shaped condensation induction passage 52 of the first supply pipe 50, the structure of the undercut 57 of the first supply pipe 50, and the structure of the condensation water guide portion 62 of the second supply pipe 60, condensation water generated when the steam is supplied from the steam generator 40 to the cavity 30 through the first supply pipe 50 and the second supply pipe 60 is prevented from flowing into the cavity 30.

Figure 8:
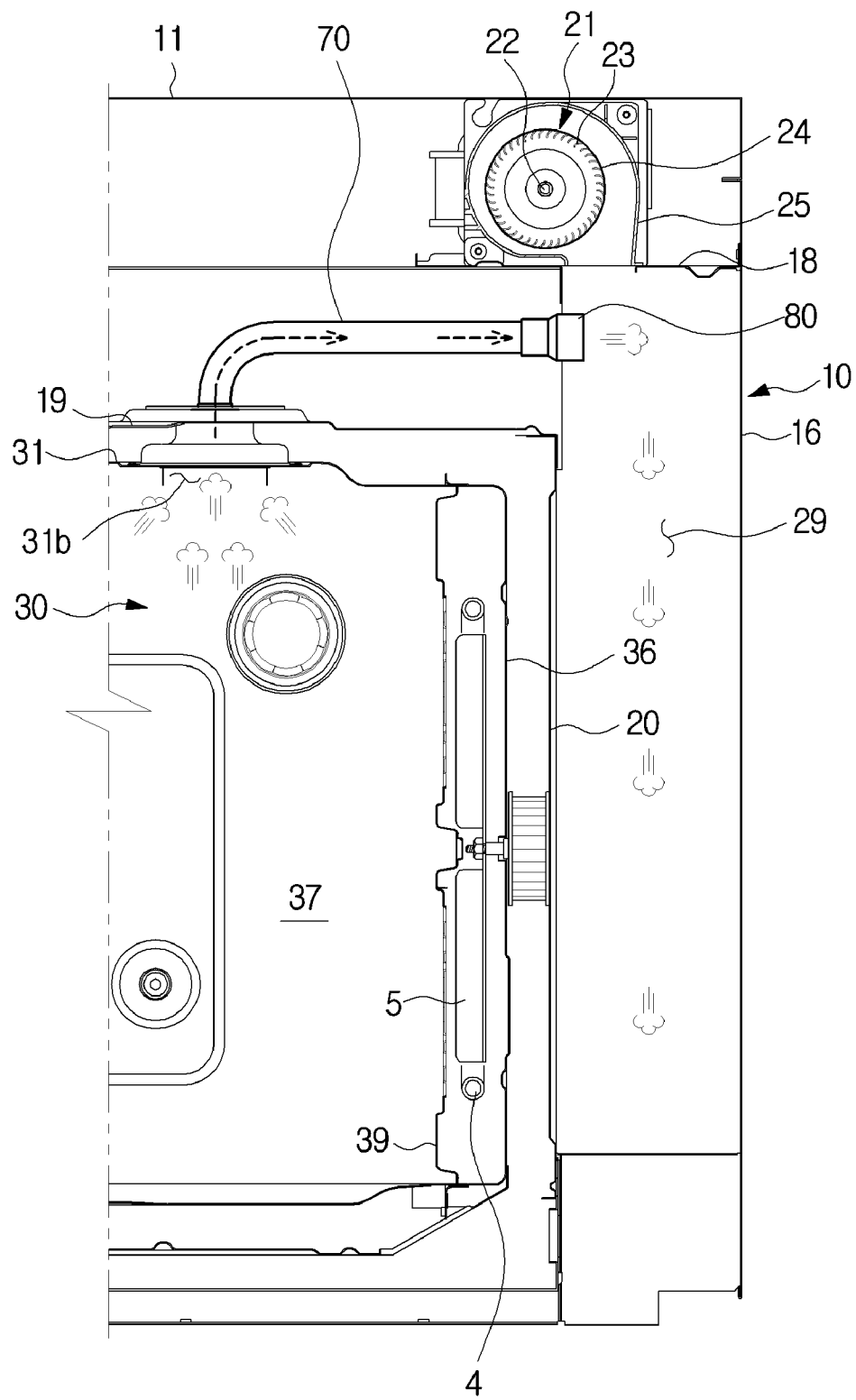
FIG. 8 is a view showing a steam discharge structure through a discharge pipe and a discharge nozzle of a steam cooker according to an embodiment of the present disclosure.
Figure 9:
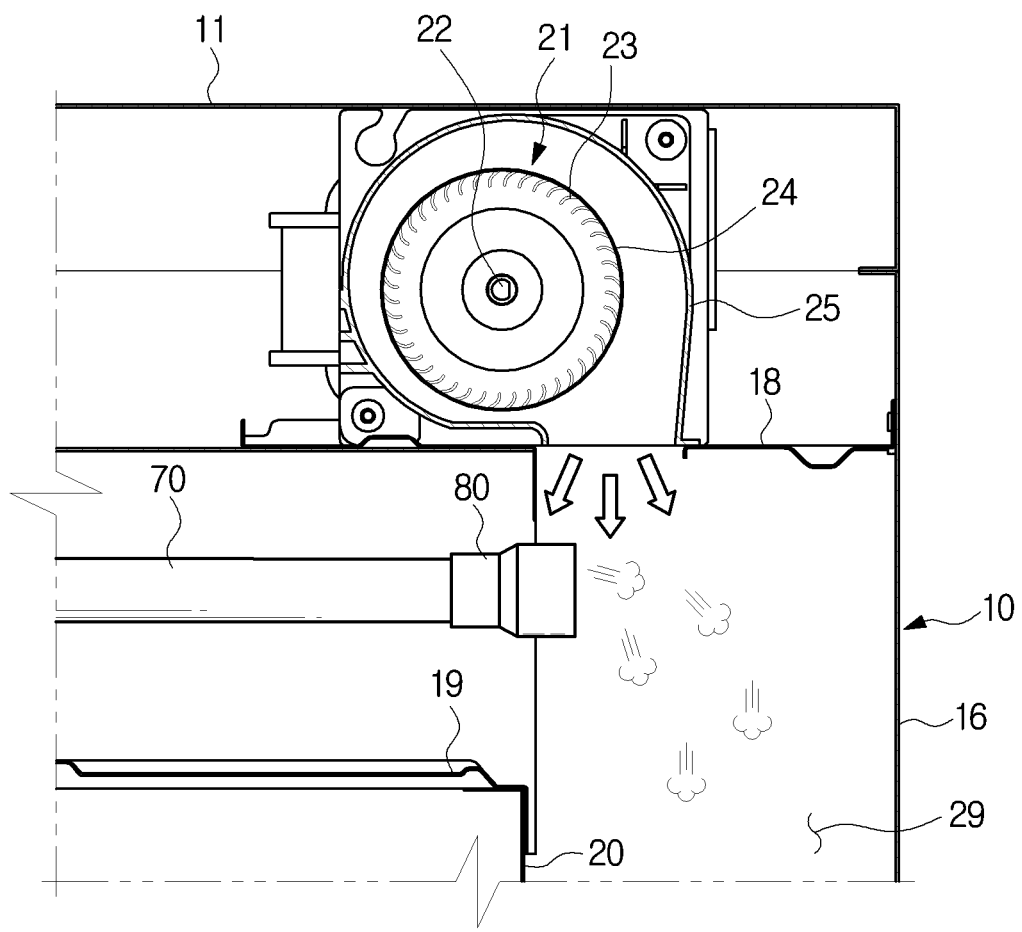
FIG. 9 is an enlarged view of one area of FIG. 8.
Figure 10:
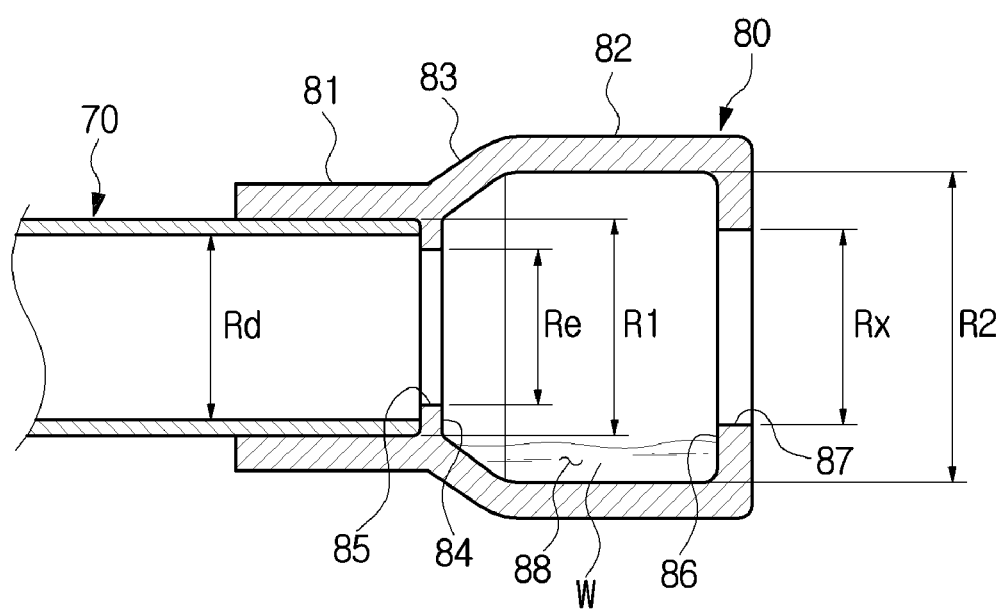
FIG. 10 is a cross-sectional view showing a structure of a discharge pipe and a discharge nozzle of a steam cooker according to an embodiment of the present disclosure.

FIG. 8 is a view showing a steam discharge structure through a discharge pipe and a discharge nozzle of a steam cooker according to an embodiment of the present disclosure. FIG. 9 is an enlarged view of one area of FIG. 8. FIG. 10 is a cross-sectional view showing a structure of a discharge pipe and a discharge nozzle of a steam cooker according to an embodiment of the present disclosure.

As shown in FIG. 10, the discharge nozzle 80 coupled to the end portion of the discharge pipe 70 includes a collecting space 88 capable of collecting condensed water generated when steam is discharged from the cavity 30 to the outside.

Specifically, the discharge nozzle 80 includes a first tube portion 81 coupled to the discharge pipe 70 and having an inner circumferential surface having a first diameter R1, and a second tube portion 82 having an inner circumferential surface having a diameter R2 larger than the first diameter R1, an expansion portion 83 that is provided between the first tube portion 81 and the second tube portion 82 and the diameter of which increases from the first tube portion 81 to the second tube portion 82, an inlet wall 84 which protrudes radially inwardly from the first tube portion 81 or the expansion portion 83 and forms an inlet 85 and an outlet wall 86 which protrudes radially inwardly from the second tube portion 82 and forms an outlet 87.

With this structure, the collecting space 88 for collecting condensed water W can be formed between the inlet wall 84 and the outlet wall 86. Condensation water collected in the collecting space 88 can be spontaneously evaporated over time. The condensed water can be prevented from falling down from the discharge nozzle 80 and sticking to the lower portion of the main body 10 by collecting the condensed water in the collecting space 88.

It is preferable that a diameter Rx of the outlet 87 is formed to be equal to or larger than a diameter Re of the inlet 85. This is because when the air that has entered the discharge nozzle 80 through the inlet 85 is discharged to the outside of the discharge nozzle 80 through the outlet 87, the noise can be reduced while the air is diffused.

The discharge pipe 70 and the discharge nozzle 80 can be coupled to each other by inserting the discharge pipe 70 into the first tube portion 81 of the discharge nozzle 80. The inlet wall 84 of the discharge nozzle 80 may serve as a stopper for limiting the insertion depth of the discharge pipe 70. For this purpose, the diameter Re of the inlet 85 should be less than or equal to an inner diameter Rd of the discharge pipe 70.

As shown in FIGS. 8 and 9, the above-described discharge nozzle 80 is provided below the cooling fan 21 disposed at the rear upper portion of the main body 10 for circulating air to cool the cavity 30, and may be disposed adjacent to the cooling fan 21.

The cooling fan 21 is preferably a cross-flow fan that draws air in one tangential direction and discharges air in another tangential direction. Specifically, the cooling fan 21 includes a rotating shaft 22, a pair of supporting plates 24 coupled to both longitudinal ends of the rotating shaft 22, a plurality of blades 23 connecting the pair of supporting plates 24, and a scroll portion 25 formed in a gentle curved shape to guide the discharged airflow.

The cooling fan 21 sucks air on the upper side of the cavity 30 and can discharge the air into the space between the cavity rear wall 36 and the rear plate 16. The air discharged from the cooling fan 21 can flow downward in the space between the cavity rear wall 36 and the rear plate 16. Therefore, the steam discharged to the discharge nozzle 80 disposed adjacent to the cooling fan 21 below the cooling fan 21 can be guided downward by the wind discharged from the cooling fan 21.

As described above, the diffusion space 29 is provided between the rear wall of the cavity 36 and the rear plate 16, specifically between the rear support plate 20 and the rear plate 16, and the discharge nozzle 80 is disposed in the upper region of the diffusion space 29. Accordingly, the steam discharged from the discharge nozzle 80 can be guided downward by the cooling fan 21 and spread widely in the diffusion space 29.

As a result, the steam pressure and density of the steam may be lowered and the steam may not be condensed. As a result, when the steam is discharged from the cavity 30, the condensation of steam is prevented, so that the condensation water can be prevented from leaking out to the bottom of the main body 10 and the phenomenon in which the condensation water leaks to the outside can be prevented.

As described above, with the structure in which the collecting space 88 for collecting the condensed water is formed in the discharge nozzle 80 and the structure in which the discharge nozzle 80 is disposed adjacent to the lower side of the cooling fan 21, when the steam of the cavity 30 is discharged to the outside through the discharge pipe 70 and the discharge nozzle 80, the condensation water can be prevented from falling down to the lower part of the main body 10 or leaking to the outside of the main body 10.

Figure 11:
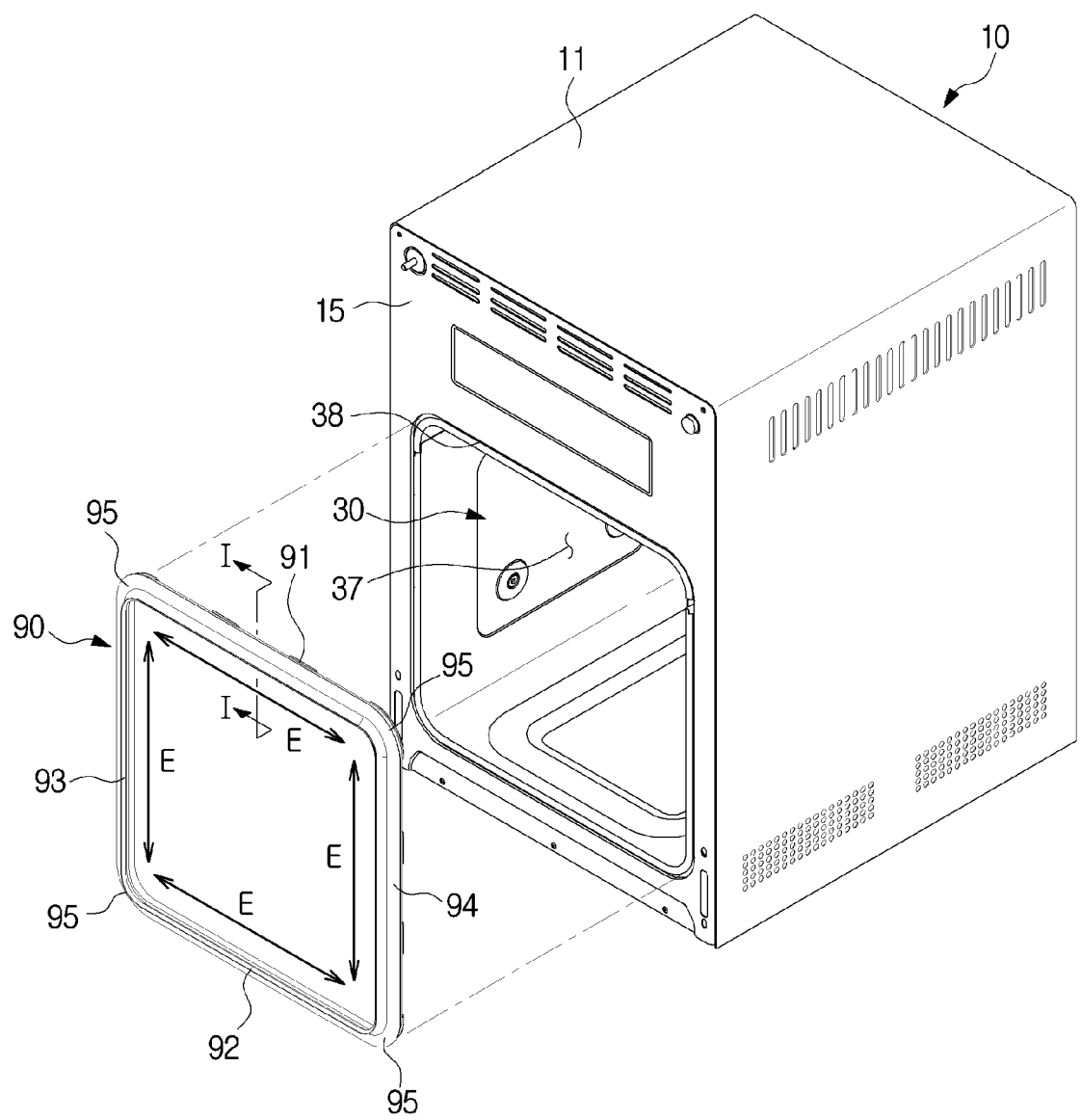
FIG. 11 is a gasket of a steam cooker according to an embodiment of the present disclosure.
Figure 12:
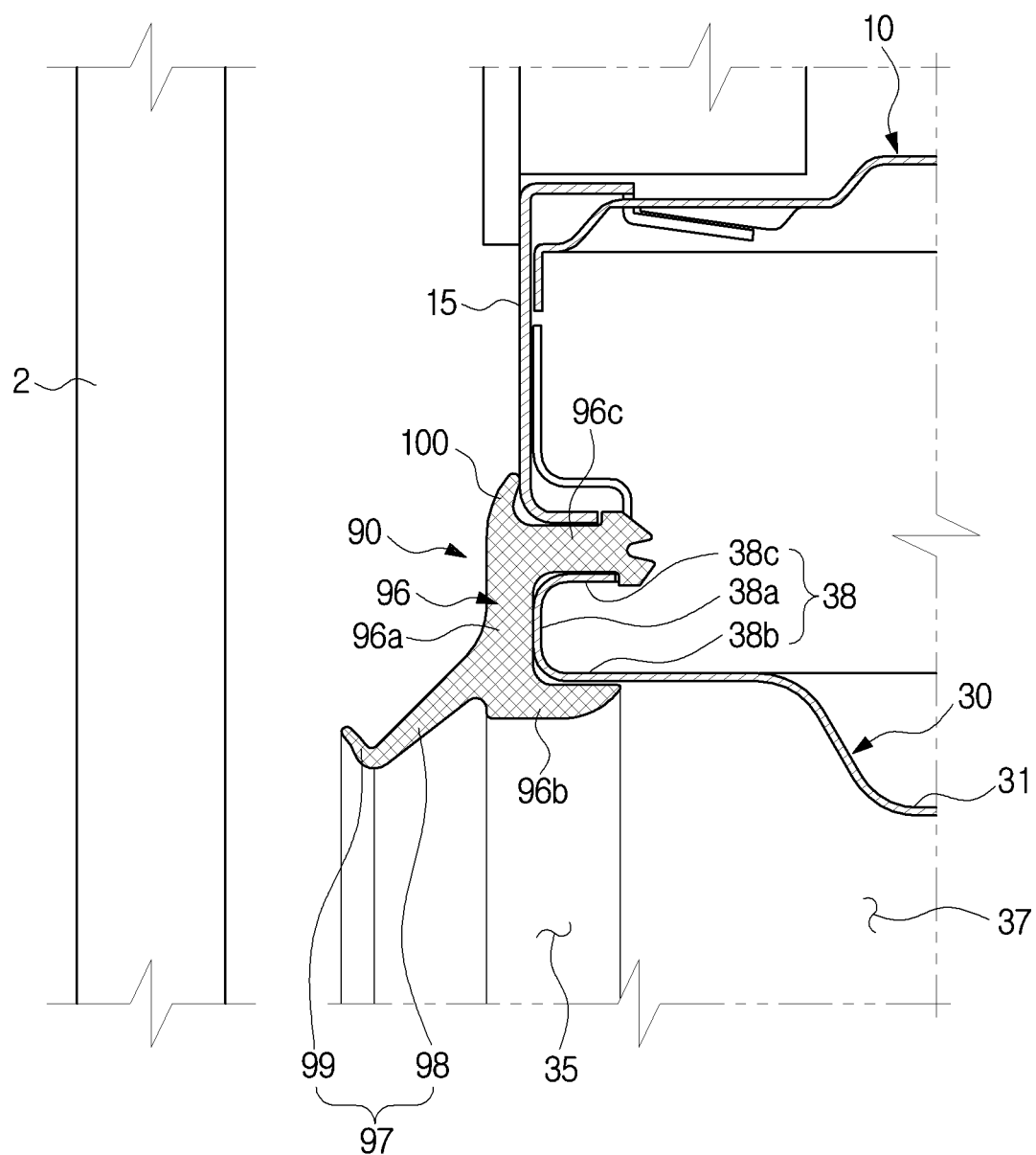
FIG. 12 is a cross-sectional view showing a mounting structure of a gasket of a steam cooker according to an embodiment of the present disclosure, and is a sectional view taken along line I-I in FIG. 11.
Figure 13:
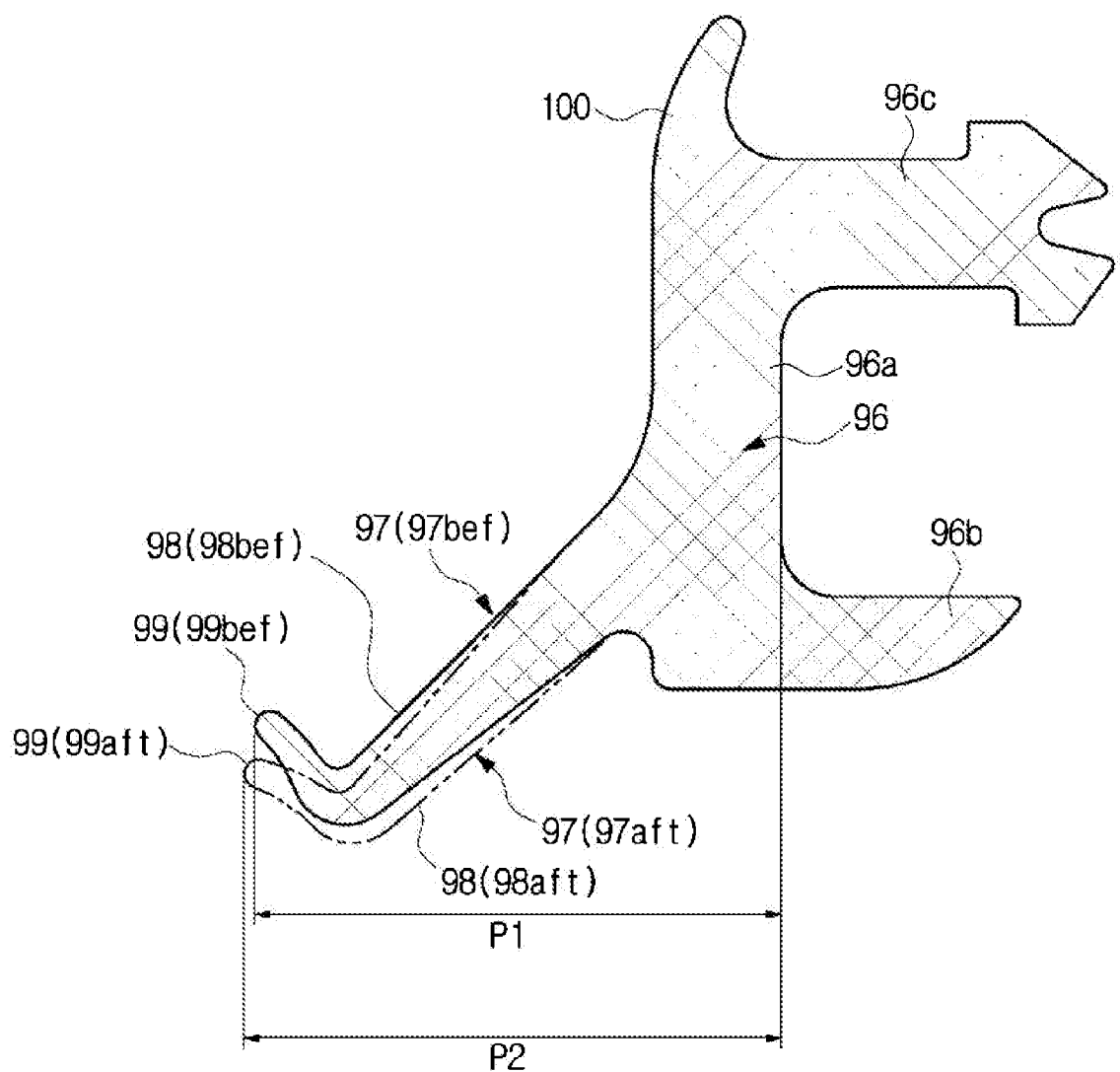
FIG. 13 is a view showing deformation of a gasket at a corner portion when the gasket of a steam cooker according to an embodiment of the present disclosure is installed.
Figure 14:
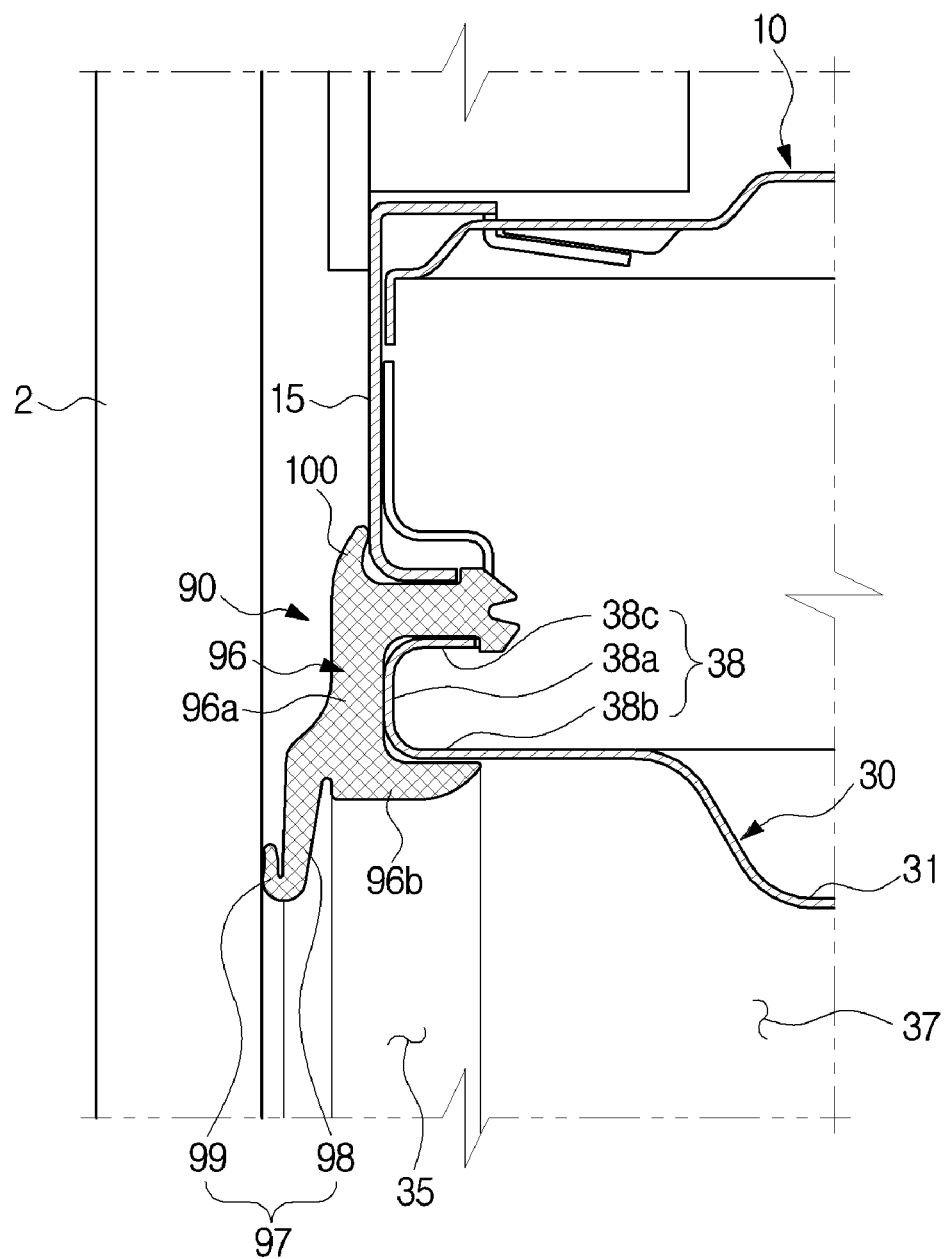
FIG. 14 is a view showing a state in which a door is closely contacted to a gasket to close a cavity of a steam cooker according to an embodiment of the present disclosure.

FIG. 11 is a gasket of a steam cooker according to an embodiment of the present disclosure. FIG. 12 is a cross-sectional view showing a mounting structure of a gasket of a steam cooker according to an embodiment of the present disclosure, and is a sectional view taken along line I-I in FIG. 11. FIG. 13 is a view showing deformation of a gasket at a corner portion when the gasket of a steam cooker according to an embodiment of the present disclosure is installed. FIG. 14 is a view showing a state in which a door is closely contacted to a gasket to close a cavity of a steam cooker according to an embodiment of the present disclosure.

The gasket 90 provided at a front portion of the cavity 30 to close the cavity 30 of the steam cooker according to an embodiment of the present disclosure will be described with reference to FIGS. 11 and 12.

As shown in FIGS. 11 and 12, the steam cooker 1 includes the gasket 90 which is arranged to seal between the cavity 30 and the door 2 when the door 2 is closed.

The steam cooker 1 may include a gasket mounting portion 38 formed at a front portion of the cavity 30 so that the gasket 90 is installed. The gasket mounting portion 38 may be formed in a substantially rectangular shape along the rim of the front opening 35 of the cavity 30.

The gasket mounting portion 38 may be formed by bending the front end portions of the cavity upper wall 31, the lower wall 32, the left wall 33, and the right wall 34, respectively. The gasket mounting portion 38 may include a front part 38a, an inner part 38b, and an outer part 38c.

However, unlike the present embodiment, the gasket mounting portion 38 may be formed on the main body 10 instead of the cavity 30.

The gasket 90 may be formed of a stretchable material such as rubber or the like and may have a substantially rectangular shape corresponding to the shape of the gasket mounting portion 38. That is, the gasket 90 has an upper side 91, a lower side 92, a left side 93, a right side 94 and a corner portion 95 connecting the sides 91, 92, 93, 94. The corner portion 95 may be rounded.

The gasket 90 includes a gasket body portion 96 coupled to the gasket mounting portion 38, a lip portion 97 which extends from the gasket body portion 96 toward the door 2 so as to seal the opening 35 of the cavity 30, and a body enclosure 100 extending from the gasket body portion 96 to seal between the cavity 30 and the main body 10. The lip portion 97 may protrude forward by a predetermined length with respect to the gasket body portion 96.

The gasket body portion 96 has a front fixing part 96a, an inner fixing part 96b, and an outer fixing part 96c which are in close contact with the front part 38a, the inner part 38b and the outer part 38c of the gasket mounting portion 38, respectively. When the gasket mounting portion 38 is inserted into the space defined by the front fixing part 96a, the inner fixing part 96b and the outer fixing part 96c, the inner fixing part 96b and the outer fixing part 96c are brought into close contact with the gasket mounting portion 38 by elasticity so that the gasket 90 can be fixed. An adhesive member (not shown) may be further interposed between the gasket body portion 96 and the gasket mounting portion 38 to enhance the bonding force.

The gasket 90 may be formed to have a size slightly smaller than the size of the gasket mounting portion 38 in the initial state (no elastic force) for enhancing the bonding force. That is, the gasket 90 can be elastically deformed so as to be somewhat relaxed when installed at the gasket mounting portion 38. The gasket 90 can be loosened along a longitudinal direction E of the sides 91, 92, 93, 94 at the time of installation in the gasket mounting portion 38 (FIG. 11).

When the gasket 90 is installed, the gasket 90 is loosened along the longitudinal direction E of the sides 91, 92, 93 and 94 so that the protruding amount of the lip portion 97 protruding forward with respect to the gasket body portion 96 at the corner portion 95 of the gasket 90 may change. In this case, the forward protruding amount of the lip portion 97 can be reduced in general, and therefore, the door 2 and the lip portion 97 may not come into close contact with each other when the door 2 is closed. If the door 2 and the lip portion 97 are not in close contact with each other, the steam and the heat inside the cavity 30 escape to the outside, so that the cooking performance may be deteriorated.

In order to solve such a problem, according to the embodiment of the present disclosure, the lip portion 97 includes a deformation compensating portion 99 for compensating for a change in the forward protruding amount of the lip portion 97 with respect to the gasket body portion 96 at the corner portion 95 when the gasket 90 is deformed due to the installation of the gasket 90.

Specifically, the lip portion 97 includes a stem portion 98 extending forwardly from the gasket body portion 96 and extending obliquely toward the inner side of the gasket 90 toward the front and the deformation compensating portion 99 extending forward from the stem portion 98 and extending obliquely toward the outer side of the gasket 90 toward the front.

Reference numerals 97bef, 98bef and 99bef in FIG. 13 denote a lip portion, a stem portion and a deformation compensating portion at the corner portion 95 before relaxation of the gasket 90, respectively, and reference numerals 97aft, 98aft, and 99aft denote a lip portion, a stem portion, and a deformation compensating portion at the corner portion 95 after relaxation of the gasket 90, respectively.

As shown in FIG. 13, by the structure of the deformation compensating portion 99, the amount of forward projection of the lip portion 97 with respect to the gasket body portion 96 at the corner portion 95 at the time of loosening of the gasket 90 may not become small or may become rather large.

That is, a protrusion amount P2 of the lip portion 97aft after the gasket 90 is relaxed may be equal to or larger than a protrusion amount P1 of the lip portion 97bef before the gasket 90 is relaxed.

The sealing performance of the cavity 30 by the gasket 90 is improved and the steam and the heat inside the cavity 30 can be prevented from leaking to the outside according to the structure of the gasket 90 described above.

Figure 15:
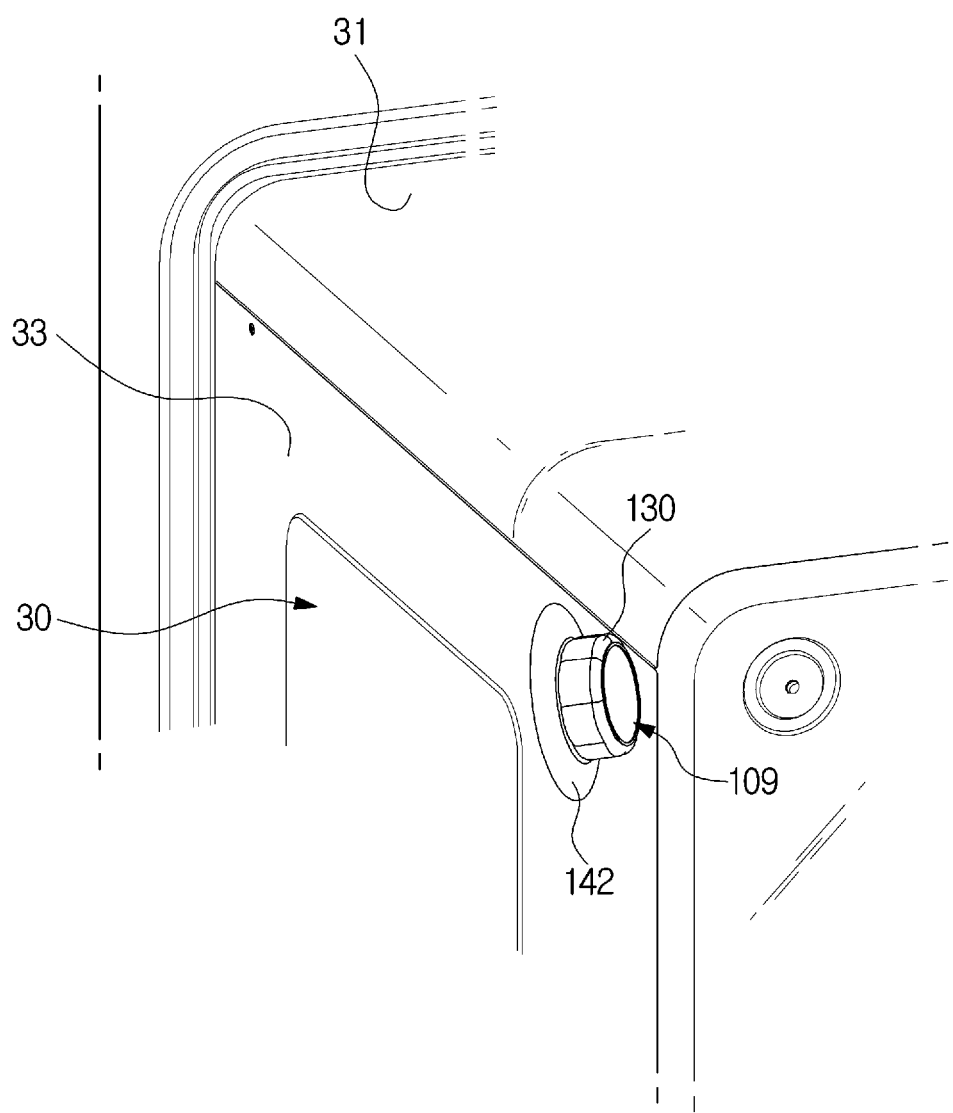
FIG. 15 is a view illustrating a lamp unit installed on a side wall of a cavity of a steam cooker according to an embodiment of the present disclosure.
Figure 16:
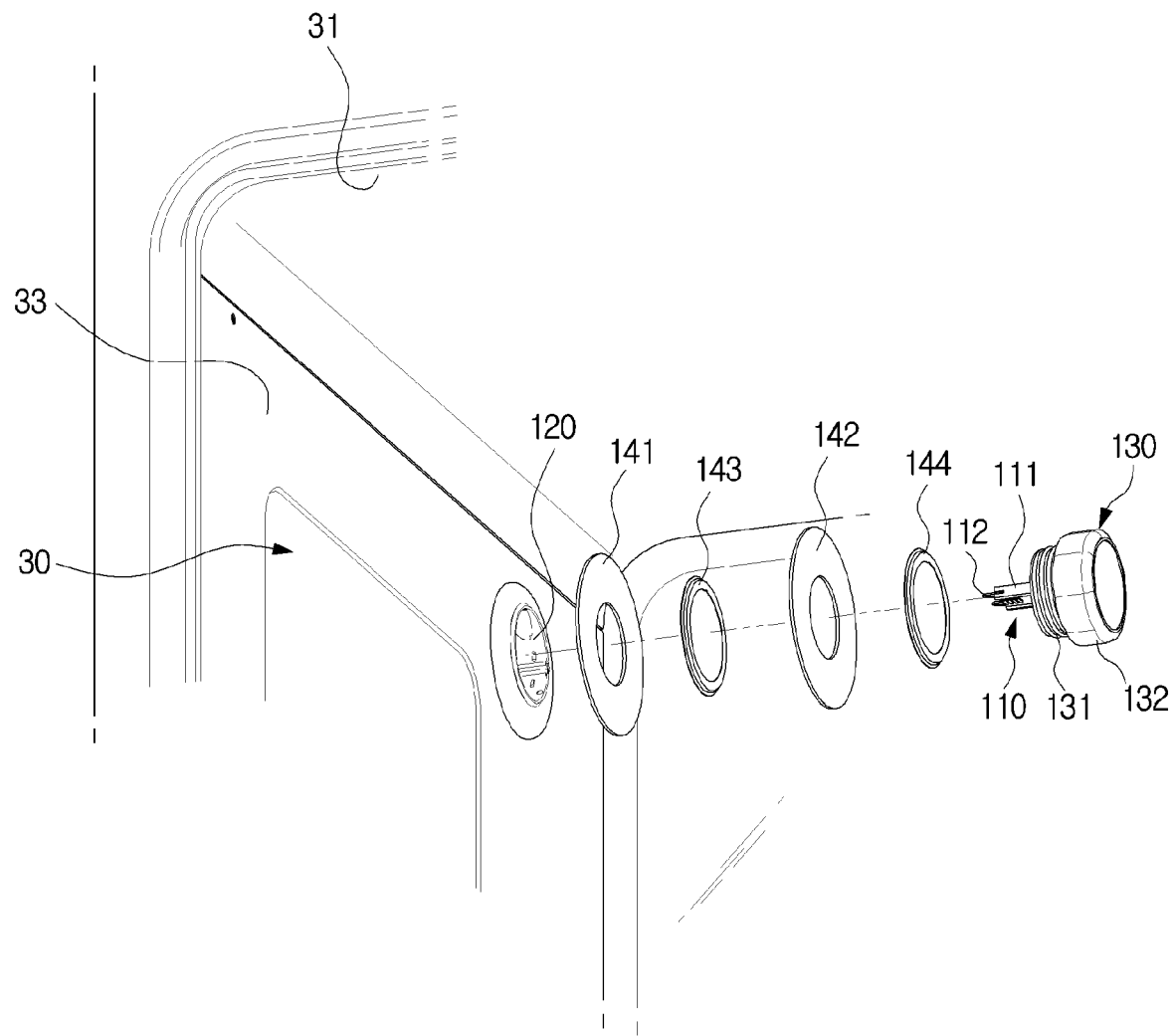
FIG. 16 is an exploded view of a lamp unit of a steam cooker according to an embodiment of the present disclosure.
Figure 17:
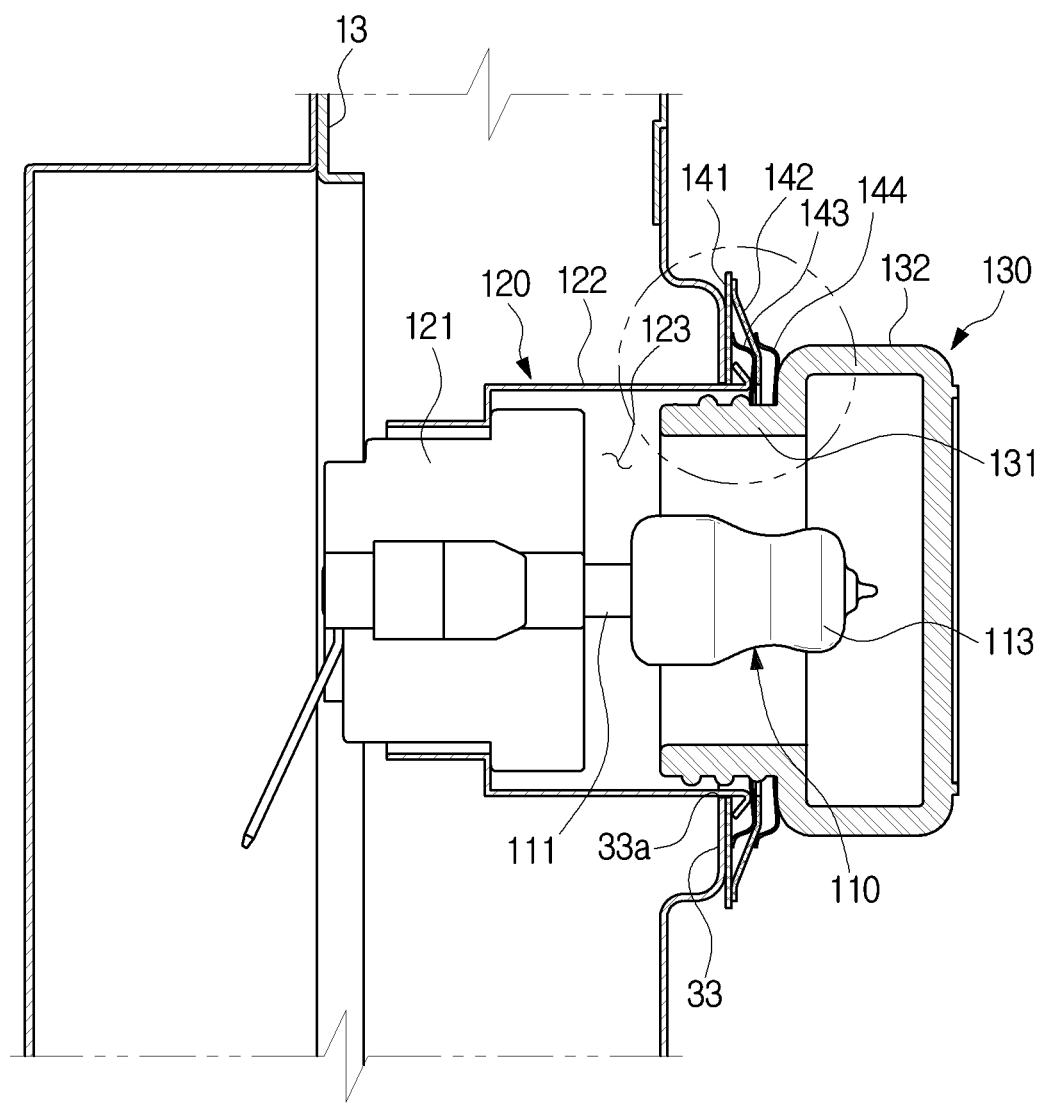
FIG. 17 is a cross-sectional view showing a lamp unit of a steam cooker according to an embodiment of the present disclosure.
Figure 18:
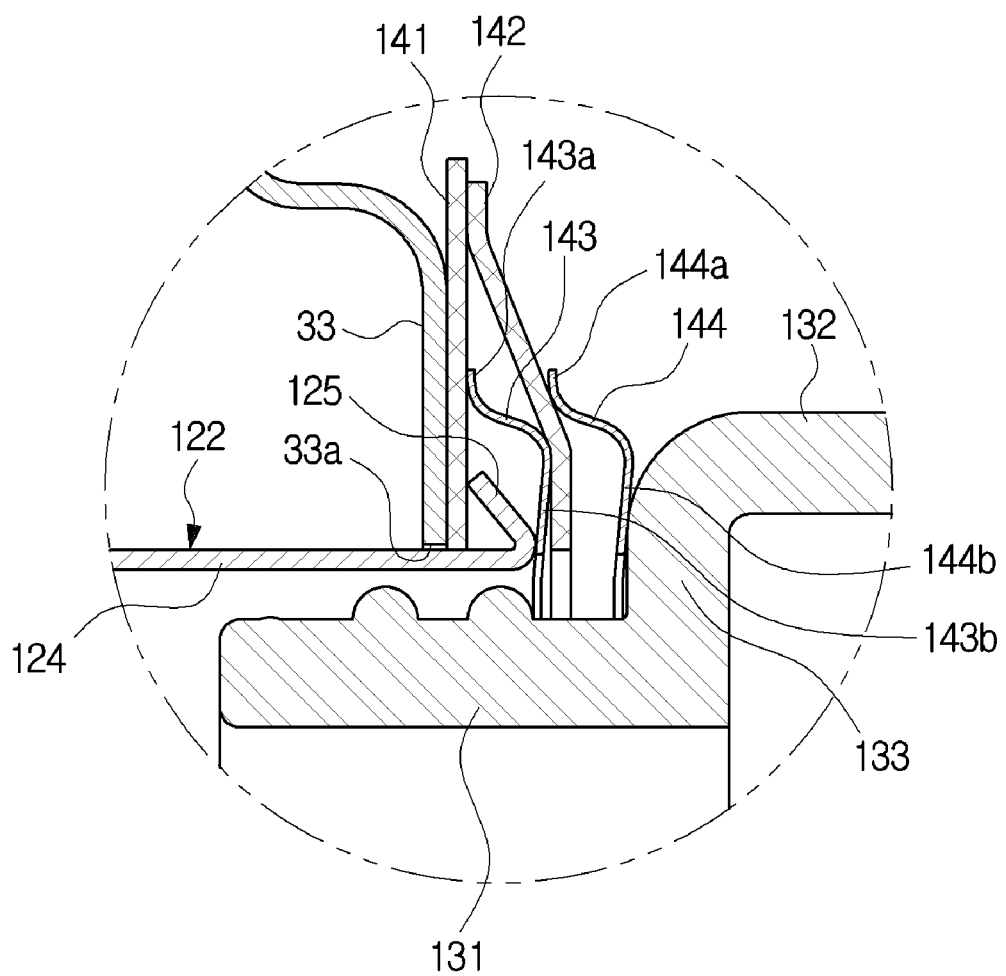
FIG. 18 is an enlarged view of a dotted line portion of FIG. 17.

FIG. 15 is a view illustrating a lamp unit installed on a side wall of a cavity of a steam cooker according to an embodiment of the present disclosure. FIG. 16 is an exploded view of a lamp unit of a steam cooker according to an embodiment of the present disclosure. FIG. 17 is a cross-sectional view showing a lamp unit of a steam cooker according to an embodiment of the present disclosure. FIG. 18 is an enlarged view of a dotted line portion of FIG. 17.

Referring to FIGS. 15 to 18, the sealing structure of the lamp mounting hole according to the embodiment of the present invention will be described.

The steam cooker 1 may include the lamp unit 109 installed in the cavity 30 to illuminate the interior of the cavity 30. A lamp installation hole 33a penetrating the left side wall 33 may be formed in the left side wall 33 of the cavity 30 so that the lamp unit 109 is installed. It goes without saying that the lamp unit 109 may be installed not only on the left side wall 33 but also on the right side wall 34, the upper wall 31, the lower wall 32 and the rear wall 36.

The lamp unit 109 includes a lamp 110 for emitting light, a socket 120 installed to penetrate the lamp installation hole 33 and supporting the lamp 110 and supplying power to the lamp 110, and a lamp cover 130 that covers the lamp 110 and protects the lamp 110.

The lamp 110 includes an LED, an incandescent lamp, a fluorescent lamp, a halogen lamp, and the like, and can receive electricity and emit light. The lamp 110 may include a light source 113 for emitting light, a coupling leg 111 for coupling the socket 120 and an electrode unit 112 receiving power.

The socket 120 may include a power source unit 121 for supplying power to the lamp 110 and a socket fixing case 122 having an insertion hole 123 therein to support the lamp 110. The socket fixing case 122 includes a cylindrical portion 124 having the insertion hole 123 formed therein and a locking portion 125 formed to be bent outward from the cylindrical portion 124 so as to be caught by the inner side surface of the side wall 33 of the cavity 30.

The lamp cover 131 may be formed of a fluorescent or translucent material so that the light of the lamp 110 passes into the cavity 30. The lamp cover 130 includes an insertion portion 131 to be inserted into the insertion hole 123 of the socket 120 to be fixed to the socket 120 and an extension portion 132 having a larger diameter than the insertion portion 131, and a washer support portion 133 provided between the insertion portion 131 and the extension portion 132.

As the lamp installation hole 33a is formed in the side wall 33 of the cavity 30, the socket 120 is inserted into the lamp installation hole 33a and the lamp cover 130 is installed in the insertion hole 123 of the socket 120, there may be a gap between the cavity 30 and the socket 120 and between the socket 120 and the lamp cover 130, and steam and heat inside the cavity 30 may leak through the gap.

Therefore, according to the embodiment of the present disclosure, the lamp unit 109 includes a first sealing member 141 that seals between the cavity 30 and the socket 120 and a second sealing member 142 that seals between the socket 120 and the lamp cover 130 to prevent leakage of steam and heat through the gaps. The first sealing member 141 and the second sealing member 142 may be formed of silicon or rubber.

Further, the lamp unit 109 includes a first washer 143 interposed between the first sealing member 141 and the second sealing member 142 and a second washer 144 interposed between the second sealing member 142 and the lamp cover 130.

The first washer 143 has a first outer supporting part 143a for sealing and fixing the first sealing member 141 to the inner circumferential surface of the cavity side wall 33 and a first inner supporting part 143b provided so as to be closely contacted between the socket fixing case 122 and the second sealing member 142.

The second washer 144 has a second outer supporting part 144a for bringing the second sealing member 142 close to the first washer 143 and a second inner supporting part 144b which is in close contact with the washer support portion 133 of the lamp cover 130.

The lamp unit 109 includes the first sealing member 141, the second sealing member 142, the first washer 143 and the second washer 144 so that the gab between the cavity 30 and the socket 120 and between the socket 120 and the lamp cover 130 can be sealed. Therefore, the steam and the heat inside the cavity 30 can be prevented from leaking out through the lamp installation hole 33a.

According to the idea of the present disclosure, when steam is supplied from the steam generator to the cavity through the steam supply pipe, the condensation water can be prevented from flowing into the cavity and returned to the steam generator.

According to the idea of the present disclosure, when the steam inside the cavity is discharged to the outside of the cavity, the steam is discharged into the diffusion space outside the cavity, so that the condensation of the steam can be prevented.

According to the idea of the present disclosure, when the steam is discharged from the inside of the cavity to the outside through the steam discharge pipe, the noise can be reduced.

According to one aspect of the present disclosure, steam in the cavity is prevented from leaking to the outside through the slit between the cavity and the door, or through the lamp installation hole, and steam in the cavity can be discharged only through the steam discharge pipe.

Although the technical idea of the present disclosure has been described with reference to specific embodiments, the scope of rights of the present invention is not limited to these embodiments. It is to be understood that the invention is not limited to the disclosed embodiments, but, on the contrary, is intended to cover various modifications and equivalent arrangements included within the spirit and scope of the appended claims.

What is claimed is:

1. A steam cooker comprising:
a main body having an opened front plate, side plates and a rear plate;
a cavity formed inside the main body and formed by side walls and a rear wall;
a steam generator to generate steam;
a supply pipe to connect the steam generator to the cavity to supply the generated steam into the cavity;
a discharge pipe to connect to the cavity to discharge steam inside the cavity therethrough;
a discharge nozzle disposed at an end portion of the discharge pipe so that the steam discharged through the discharge nozzle is diffused;
a cooling fan provided between the cavity and the main body; and
a diffusion space formed between the rear plate and the rear wall so that the steam discharged from the discharge nozzle is diffused and spread to the diffusion space by the discharge nozzle,
wherein the discharge nozzle is disposed adjacent to a bottom portion of the cooling fan such that diffused steam discharged from the discharge nozzle is guided downward between the cavity and the main body by the cooling fan.

2. The steam cooker according to claim 1,
wherein the discharge nozzle is disposed between the rear plate and the rear wall.

3. The steam cooker according to claim 2,
wherein the diffusion space is formed in a vertical direction between the rear plate and the rear wall.

4. The steam cooker according to claim 3, wherein the discharge nozzle is disposed at an upper portion of the diffusion space, and the steam discharged from the discharge nozzle flows downward from the upper portion of the diffusion space.

5. The steam cooker according to claim 3, further comprising:

a mounting space formed between the rear plate and the rear wall to receive the steam generator.

6. The steam cooker according to claim 5, further comprising:
a barrier to partition space between the rear plate and the rear wall into the diffusion space and the mounting space.

7. The steam cooker according to claim 6, wherein the barrier extends in the vertical direction between the rear plate and the rear wall, and the diffusion space and the mounting space are formed on sides of the barrier, respectively.

8. The steam cooker according to claim 3, further comprising:
a rear support plate disposed between the rear plate and the rear wall to support the steam generator, and
wherein the diffusion space is formed between the rear plate and the rear support plate.

9. The steam cooker according to claim 1, wherein the discharge nozzle includes a collecting space formed to collect condensation water generated when steam in the cavity is discharged to the outside of the cavity.

10. The steam cooker according to claim 9, wherein the discharge nozzle includes a first tube portion coupled to the discharge pipe, a second tube portion having a diameter larger than a diameter of the first tube portion, an expansion portion that is provided between the first tube portion and the second tube portion and a diameter of the expansion portion increases toward the second tube portion, an inlet wall protruding radially inwardly from the first tube portion or the expansion portion and forming an inlet, and an outlet wall protruding radially inwardly from the second tube portion and forming an outlet, and
the collecting space is formed between the inlet wall and the outlet wall.

11. The steam cooker according to claim 10, wherein a diameter of the outlet is equal to or greater than a diameter of the inlet.

12. The steam cooker according to claim 10, wherein a diameter of the inlet is smaller than or equal to a diameter of an inner circumferential surface of the discharge pipe.

* * * * *